United States Patent
Oku et al.

(10) Patent No.: US 9,932,650 B2
(45) Date of Patent: *Apr. 3, 2018

(54) FERRITIC STAINLESS STEEL MATERIAL FOR BRAZING AND HEAT EXCHANGER MEMBER

(75) Inventors: Manabu Oku, Yamaguchi (JP);
Sadayuki Nakamura, Yamaguchi (JP);
Yoshiaki Hori, Yamaguchi (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 1594 days.

This patent is subject to a terminal disclaimer.

(21) Appl. No.: 13/376,708

(22) PCT Filed: Jun. 14, 2010

(86) PCT No.: PCT/JP2010/060060
§ 371 (c)(1),
(2), (4) Date: Dec. 7, 2011

(87) PCT Pub. No.: WO2010/147092
PCT Pub. Date: Dec. 23, 2010

(65) Prior Publication Data
US 2012/0085513 A1    Apr. 12, 2012

(30) Foreign Application Priority Data
Jun. 15, 2009 (JP) .................................. 2009-142666

(51) Int. Cl.
| | | |
|---|---|---|
| *C22C 38/04* | (2006.01) | |
| *C21D 8/02* | (2006.01) | |
| *B23K 35/30* | (2006.01) | |
| *C21D 6/00* | (2006.01) | |
| *C22C 38/00* | (2006.01) | |
| *C22C 38/02* | (2006.01) | |
| *C22C 38/20* | (2006.01) | |
| *C22C 38/26* | (2006.01) | |
| *F28F 21/08* | (2006.01) | |
| *B23K 101/14* | (2006.01) | |
| *F28D 7/16* | (2006.01) | |
| *F28D 21/00* | (2006.01) | |
| *F28F 1/12* | (2006.01) | |

(52) U.S. Cl.
CPC .......... *C21D 8/0273* (2013.01); *B23K 35/308* (2013.01); *C21D 6/002* (2013.01); *C22C 38/001* (2013.01); *C22C 38/02* (2013.01); *C22C 38/04* (2013.01); *C22C 38/20* (2013.01); *C22C 38/26* (2013.01); *F28F 21/089* (2013.01); *B23K 2201/14* (2013.01); *F28D 7/16* (2013.01); *F28D 21/0003* (2013.01); *F28F 1/12* (2013.01)

(58) Field of Classification Search
CPC . C22C 35/00; C22C 33/0257; C22C 33/0285; C22C 38/001; C22C 38/02; C22C 38/04; C22C 38/18; C22C 38/20; C22C 38/22; C22C 38/24; C22C 38/26; C22C 38/28; C22C 38/30

See application file for complete search history.

(56) References Cited

U.S. PATENT DOCUMENTS

| | | | |
|---|---|---|---|
| 6,257,483 B1 * | 7/2001 | Inaba ....................... | 228/262.42 |
| 6,383,309 B2 * | 5/2002 | Hirata et al. .................. | 148/325 |
| 2004/0065390 A1 * | 4/2004 | Oku et al. ..................... | 148/325 |
| 2006/0237102 A1 * | 10/2006 | Oku et al. ..................... | 148/325 |

FOREIGN PATENT DOCUMENTS

| | | | |
|---|---|---|---|
| JP | 07-292446 | 11/1995 | |
| JP | 10204591 A * | 8/1998 | ............. C22C 38/00 |
| JP | 2003-193205 | 7/2003 | |
| JP | 2007-191739 | 8/2007 | |
| JP | 2009-007601 | 1/2009 | |
| JP | 2009-068102 | 4/2009 | |
| JP | 2009-174040 | 8/2009 | |

OTHER PUBLICATIONS

NPL-1—Hartmann, T., & Nuetzel, D. (2009). New amorphous brazing foils for exhaust gas applications. In Proceedings of the 4th International Brazing and Soldering Conference, IBSC (pp. 110-118).*

English Machine Translation of JP 10-204591 A of Miyazaki et al. (Aug. 1998).*

* cited by examiner

*Primary Examiner* — Roy V King
*Assistant Examiner* — Jophy S. Koshy
(74) *Attorney, Agent, or Firm* — Clark & Brody

(57) ABSTRACT

A ferritic stainless steel material for brazing without grain coarsening has a partially recrystallized structure and composition comprising, in % by mass, C:0.03% or less, Si: more than 0.1 to 3%, Mn: 0.1 to 2%, Cr: 10 to 35%, Nb: 0.2 to 0.8%, N: 0.03% or less, if necessary, at least one of Mo, Cu, V and W: 4% or less in total, at least one of Ti and Zr: 0.5% or less in total, at least one of Ni and Co: 5% or less in total, or at least one of Al: 6% or less, REM (rare earth metal): 0.2% or less and Ca: 0.1% or less, the remainder being Fe and unavoidable impurities, wherein area ratio in percentage of recrystallized grains formed by heating after cold working is from 10 to 80%.

9 Claims, 4 Drawing Sheets

FERRITIC STAINLESS STEEL MATERIAL FOR BRAZING AND HEAT EXCHANGER MEMBER

TECHNICAL FIELD

The present invention relates to a ferritic stainless steel suitable for a heat exchanger member to which high temperature brazing such as nickel brazing is applied, and a brazed heat exchanger member using the same.

BACKGROUND ART

In vehicles having internal combustion engine mounted thereon including automobiles, a technique of EGR (Exhaust Gas Recirculation) is sometimes employed for the purpose of $NO_x$ reduction in exhaust gas and improvement of fuel efficiency. This technique is a technology of taking out a part of exhaust gas exhausted from an internal combustion engine, and again breathing from intake side of the internal combustion engine, and has become widely used mainly in a diesel engine. However, in recent years, the technology is getting to be applied to a gasoline engine.

EGR system requires an apparatus to cool exhaust gas to a temperature at which the exhaust gas can be circulated. This is EGR cooler.

Even in a latent heat recovery equipment of a water heater, a heat exchanger is used for the purpose of $CO_2$ reduction in combustion exhaust gas and reutilization of heat, and a secondary heat exchanger that can reduce a temperature of combustion gas exhausted at about 200° C. up to about 50~80° C. is developed.

General structure of a heat exchanger recovering heat of exhaust gas is schematically shown in FIG. 1 and FIG. 2. Heat exchange section partitioned by two partition plates is provided at a part of exhaust gas flow passage constituted of an external cylinder, and the section is constituted of a heat exchanger which allows heat to escape in cooling water. Air pipe is connected to the partition plate at a perforated portion thereof, and exhaust gas flows in the air pipe in the heat exchange section. The cooling water flows around the air pipe. The air pipe includes a type constituted of a pipe merely made of a metal (FIG. 1) and a type having a fin provided in the pipe (FIG. 2).

Such a heat exchanger is constituted of metal members such as an external cylinder, a partition plate, an air pipe, and a fin in the air pipe, and those members are joined by brazing. Copper brazing filler, copper alloy brazing filler, nickel brazing filler, iron brazing filler and the like are used as a brazing filler metal. However, in EGR cooler and the like, because the exhaust gas temperature at the inlet side of the heat exchange section sometimes reaches up to about 800° C. and the temperature at the outlet side sometimes reaches up to about 200° C., nickel brazing filler (BNi-5, BNi-6 and the like of JIS Z3265) having excellent high temperature oxidation resistance and high temperature strength is frequently used.

The metal member constituting the heat exchanger requires the following characteristics.
(1) Brazability is good
(2) Corrosion resistance under usage environment is good.
  For example, in automobile applications, corrosion resistance to snow melting salt is good. Particularly, in EGR applications, corrosion resistance to LLC (Long Life Coolant; for example, ethylene glycol) is good. In water heater applications, corrosion resistance in the case of being exposed to outdoor environment is good.
(3) Corrosion resistance to cooling water (heat medium) is good. For example, in EGR applications, corrosion resistance to LLC (Long Life Coolant; for example, ethylene glycol) is good.
(4) Corrosion resistance to dew condensation of water is good. In a member exposed to engine exhaust gas and combustion exhaust gas, dew condensation is easy to occur in the vicinity of exhaust gas outlet side during operation, and dew condensation is easy to occur in exhaust gas contact portion after operation.
(5) High temperature strength and high temperature oxidation resistance are good. The reason for this is that a heat exchanger which recovers heat of exhaust gas is exposed to high temperature gas.

PRIOR ART REFERENCE

Patent Document

Patent Document 1: JP-A 2003-193205
Patent Document 2: JP-A 7-292446

SUMMARY OF THE INVENTION

Problems that the Invention is to Solve

In view of the above requirement characteristics, currently, austenitic stainless steel represented by SUS304 and SUS316 is mainly used in a metal member of a heat exchanger which recovers heat of exhaust gas. For example, Patent Document 1 describes parts for exhaust gas recirculation system using austenite stainless cast steel. However, because the austenitic stainless steel has a large coefficient of thermal expansion, oxidized scale on the surface of the member, formed at high temperature separates from the surface at the time of cooling and flows in a pipe line, and thermal fatigue failure due to repetition of heating and cooling is easy to occur. Further improvement is desired in high temperature strength. Furthermore, because expensive Ni is contained in large amount, material cost is high.

On the other hand, ferritic stainless steel has a coefficient of thermal expansion smaller than that of austenitic steel grade, and its material cost is generally cheaper than that of the austenitic steel grade. The ferritic stainless steel is frequently used in exhaust manifold, muffler and the like constituting exhaust gas passage. However, there is the problem that crystal grains are easy to cause coarsening when exposed to high temperature. For example, when exposed to brazing at high temperature such as 1,100° C. or higher, the ferritic stainless steel generally induces abnormal coarsening of crystal grains. The coarsening is a phenomenon of abnormal grain growth defined as follows. So-called secondary recrystallization that recrystallized grains showing fast growth grow during the progress of recrystallization by fitting together with other recrystallized grains rapidly proceeds by high temperature heating. In the present description, this abnormal grain growth is called "grain coarsening". In ferritic stainless steel in which grain coarsening occurred, toughness is decreased. Furthermore, in the portion at which coarse crystal grains penetrating the thickness are present, the crystal grains may drop out by grain boundary corrosion as the starting point, and in this case, a through-hole is formed on the member.

Patent Document 2 discloses a ferritic stainless steel for a heat exchanger, having good brazability. However, the ferritic stainless steel is not attended to be subjected to high temperature brazing exposed to 1,100° C. or higher, and improvement of nickel brazability and prevention of grain coarsening in such a case are not yet done and solved.

The present invention has an object to provide a ferritic stainless steel in which grain coarsening is prevented in the case that the stainless steel is exposed to the above high temperature as a heat exchanger member, and a heat exchanger including the ferritic stainless steel free of grain coarsening after brazing.

Means for Solving the Problems

The above object is achieved by a ferritic stainless steel material for brazing, having partially recrystallized structure and a chemical composition including, in % by mass, C:0.03% or less, Si: more than 0.1 to 3%, Mn: 0.1 to 2%, Cr: 10 to 35%, Nb: 0.2 to 0.8%, N: 0.03% or less, if necessary, at least one of Mo, Cu, V and W: 4% or less in total, at least one of Ti and Zr: 0.5% or less in total, at least one of Ni and Co: 5% or less in total, or at least one of Al: 6% or less, REM (rare earth metal): 0.2% or less and Ca: 0.1% or less, and the remainder being Fe and unavoidable impurities, preferably the total content of C and N being 0.01% or more, wherein area ratio of recrystallized grains formed by heating after cold working is from 10 to 80%.

The present invention provides a heat exchanger member comprising a ferritic stainless steel brazed using any one of nickel brazing filler defined in JIS Z3265, nickel brazing filler containing Ni in an amount of 35% by mass or more, copper brazing filler or copper alloy brazing filler, defined in JIS Z3262, and iron brazing filler (brazing filler containing iron in an amount of 35% by mass or more), wherein ferrite crystal grains of the steel do not penetrate the thickness of the steel and have an average crystal grain size of 500 μm or less. The member specifically includes an external cylinder, a partition plate, an air pipe and the like constituting a heat exchanger recovering heat of exhaust gas. In particular, the member is preferably EGR cooler member of automobiles, obtained by brazing the steel using nickel brazing filler defined in JIS Z3265, or nickel brazing filler containing Ni in an amount of 35% by mass or more.

An average crystal grain size is evaluated using an average value of equivalent circle diameter which is measured as followings. In metal structure of a cross-section (L cross-section) vertical in a thickness direction of a steel plate and in a direction of the cold working, area of individual ferrite crystal grain is measured, and an equivalent circle diameter of the grain is calculated. The average value of those equivalent circle diameters is used to evaluate an average crystal grain size. The observation region is a continuous region of 1 mm² or more. The measurement can be made using an image processor.

Advantage of the Invention

According to the present invention, a ferritic stainless steel that can prevent grain coarsening in the case that the steel is subjected to high temperature brazing such as nickel brazing is provided. Use of the steel achieves a heat exchanger having improved thermal fatigue characteristics, less separation of oxidized scale and low material cost, as compared with the conventional heat exchanger using austenitic stainless steel as a member.

MODE FOR CARRYING OUT THE INVENTION

Figure 1:
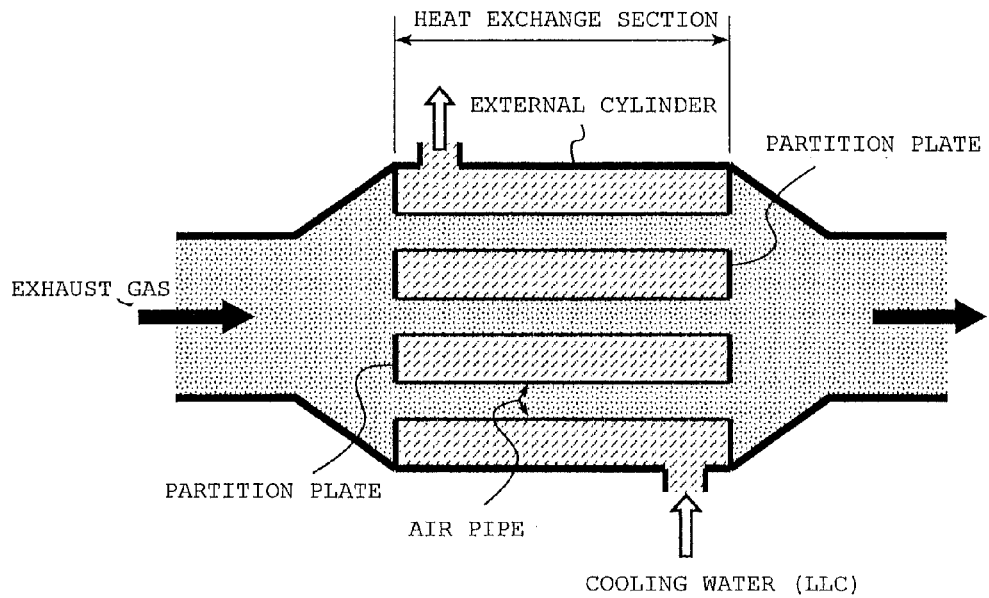
FIG. 1 is a view schematically showing the structure of a heat exchanger recovering heat of exhaust gas.
Figure 2:
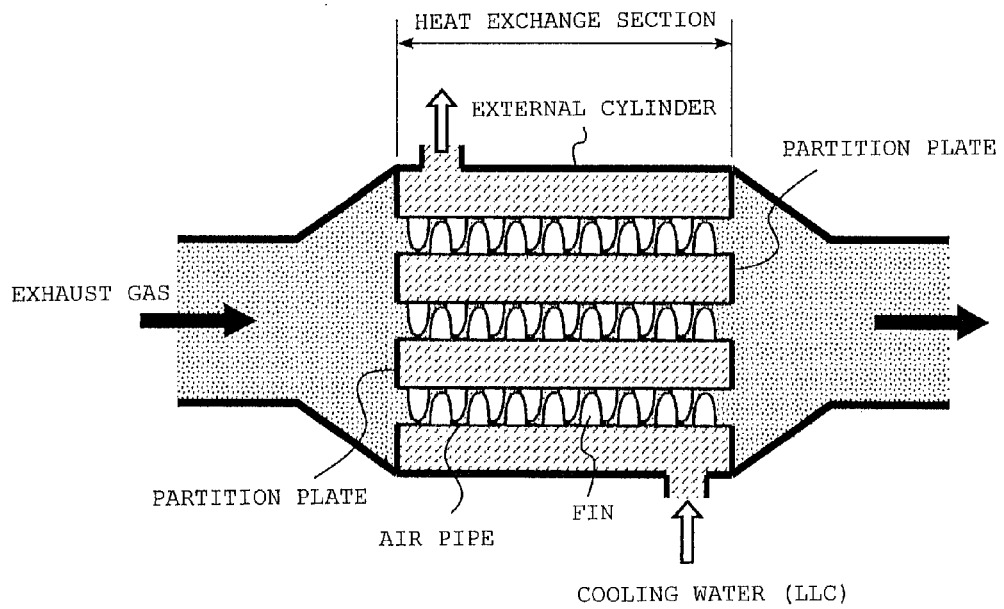
FIG. 2 is a view schematically showing the structure of a heat exchanger recovering heat of exhaust gas, which is a type having a fin in an air pipe.
Figure 3:
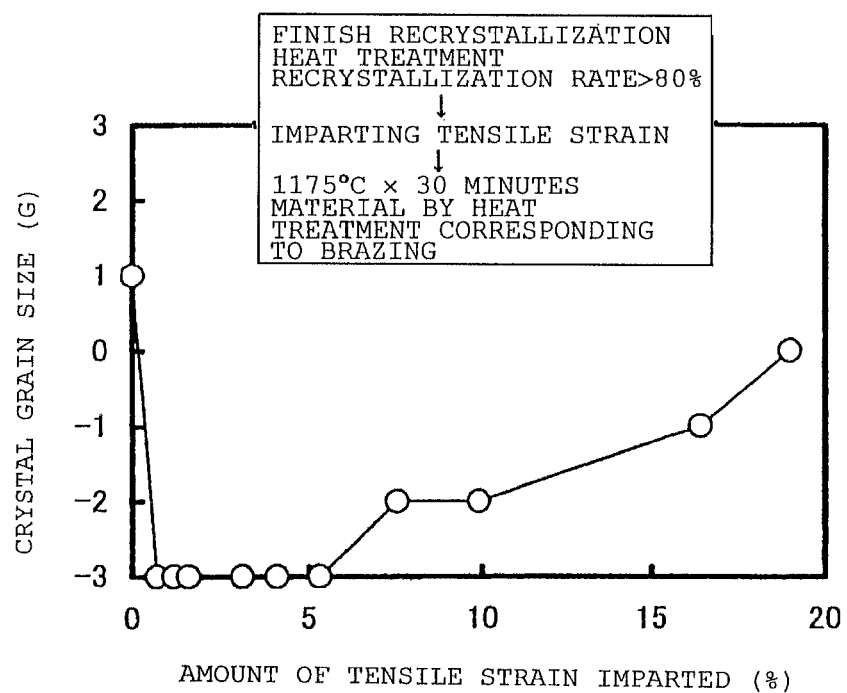
FIG. 3 is a graph plotting crystal grain size G after heating ferritic stainless steel having tensile strain in a range of from 0 to 20% imparted thereto, at 1,175° C. for 30 minutes.

According to the investigations by the present inventors, it has been found that even in a material which does not cause grain coarsening when, for example, a steel sheet sample is simply heated to high temperature of 1,100° C. or higher (for example, 1,175° C. in nickel brazing temperature region), when the material is formed into a heat exchanger member, and then the member is subjected to nickel brazing, coarsening occurs, sometimes becoming the problem. The reason for this is considered that high Cr ferritic steel has the property that grain coarsening is easy to occur at high temperature heating in the case that the steel has been subjected to relatively mild working of about from 0.5 to 10% after annealing. One example of the results of experiments conducted by the present inventors is shown in FIG. 3. This is a graph obtained by plotting crystal grain size G (JIS G0552: 2005) after heating 18Cr-1Mn-2Mo-0.65Nb-0.1Cu steel having tensile strain in a range of from 0 to 20% imparted thereto, at 1,175° C. for 30 minutes. It is seen that grain coarsening is most easy to occur in the case of conducting mild working from about 0.5 to 5%. Members (external cylinder, partition plate, air pipe and the like) being subjected to brazing, of a heat exchanger often have a portion which has received such mild working during shape forming, and it is considered that this is the factor to encourage the grain coarsening.

The present inventors had made various investigations on the technique of preventing grain coarsening at high temperature heating of ferritic stainless steel having applied thereto such mild working. As a result, it has been found that in case such partially recrystallized structure that an area ratio (area ratio of recrystallized grains) occupied by recrystallized grains in cross-sectional structure being from 10 to 80% has been occurred in the stage of finish annealing for producing a steel sheet, the subsequent grain coarsening can remarkably be prevented at high temperature heating after undergoing mild shape forming. From the standpoint of securing workability, the area ratio in percentage of recrystallized grains is more preferably from 30 to 70%. The "recrystallized grain" is ferrite crystal grain newly formed by heating conducted after cold working. In the present description, this heating is called "recrystallization heat treatment". Furthermore, the area ratio of the recrystallized grain is called "recrystallization rate".

Figure 4:
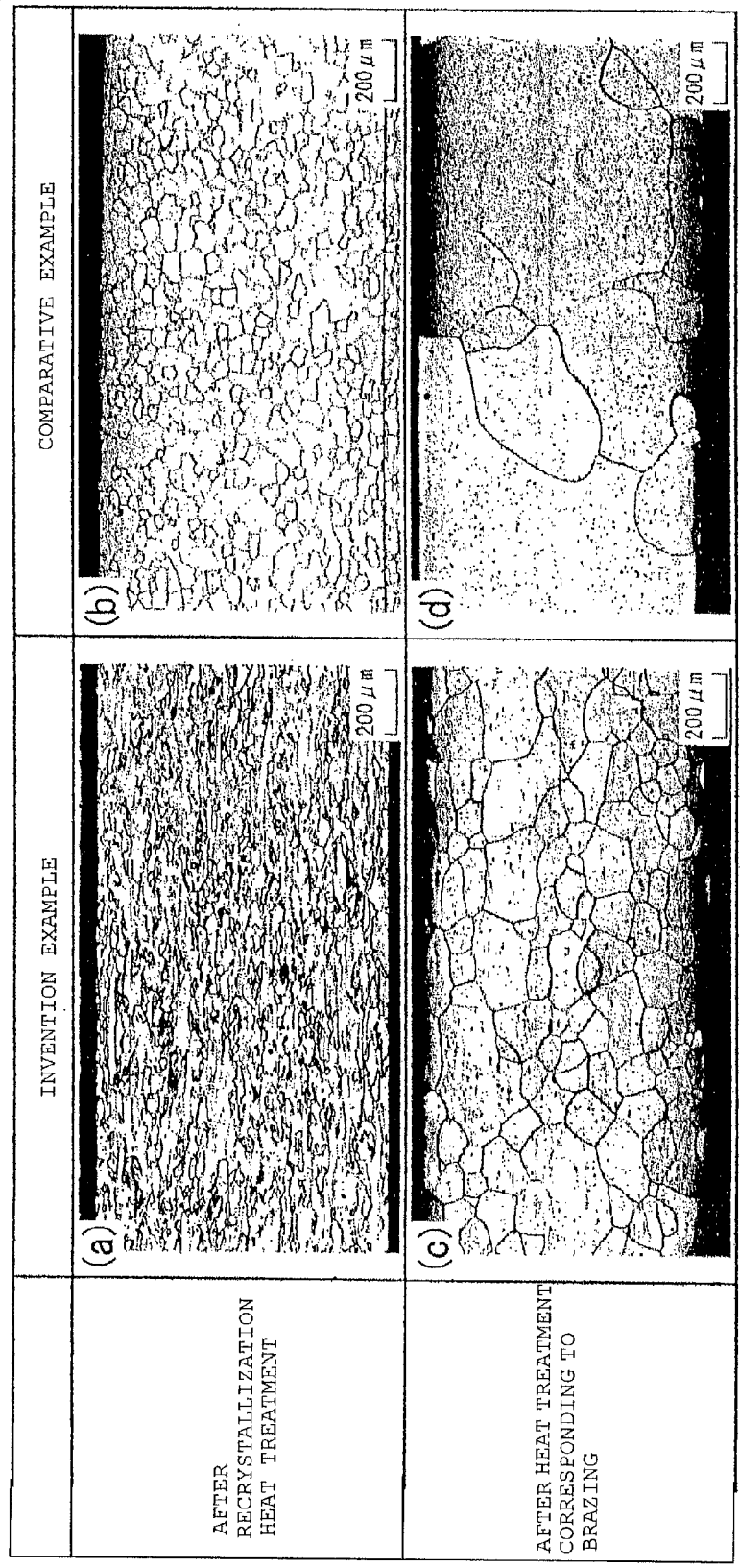
FIG. 4 is optical micrographs exemplifying a cross-sectional structure after recrystallization heat treatment of ferritic stainless steel and a cross-sectional structure after heat treatment corresponding to brazing to the steel.

Regarding a steel sheet of 18Cr-1Mn-2Mo-0.65Nb-0.1Cu steel, FIG. 4 shows cross-sectional structures (a) and (b) after recrystallization heat treatment, and cross-sectional structures (c) and (d) in the case of conducting a heat treatment corresponding to brazing i.e. the materials are subjected to the heating at 1,175° C. for 30 minutes after about 2% of working strain is imparted to those materials. FIG. 4(a) is a steel sheet corresponding to the present invention that the area ratio (recrystallization rate) of recrystallized grain formed by heating after cold working is about 50%. As shown, the recrystallization rate can be measured by observation of the structure with an optical microscope. The observation plane is a cross-section (L cross-section) parallel to a rolling direction, new crystal grain (recrystallized grain) formed by the recrystallization heat treatment is appeared in crystal grain extended in a rolling direction by cold rolling, and partially recrystallized structure is shown. As seen in FIG. 4(c), grain coarsening does not occur after the heat treatment corresponding to brazing. On the other hand, FIG. 4(b) is general annealed material having the recrystallization rate of 95% or more. In the case of steel in such a structure state, grain coarsening occurs after the heat treatment corresponding the brazing, as shown in FIG. 4(d). Ferrite crystal grains penetrating steel thickness are present.

The recrystallization rate can be measured as follows. In the L cross-section, metal structure is exposed by a mixed liquid of hydrofluoric acid and nitric acid. Measurement region of 0.5 mm$^2$ or more is provided on the L cross-section. Crystal grains (including crystal grains split by a boundary line of the measurement region) present on the measurement region are classified into crystal grains in which deformation structure (slip band) are observed and crystal grains in which the deformation structure are not observed. The proportion (%) of the total area of "crystal grains in which the deformation structure are not observed" to the measurement region is obtained, and the value is considered as the recrystallization rate.

The recrystallization rate can be controlled by cold working ratio before recrystallization heat treatment, and temperature and time of recrystallization heat treatment. The cold working ratio in percentage before recrystallization heat treatment is desirably a range of from 25 to 90%. By using a cold worked steel having the working ratio in this range, control for achieving given recrystallization rate in good precision by the recrystallization heat treatment is easy to conduct. Although varying depending on component composition of steel, for example, in the case of Nb-containing ferritic stainless steel, in the case of cold rolled steel of about 75% rolling reduction, optimum conditions of the recrystallization heat treatment for obtaining partially recrystallized structure having the recrystallization rate in percentage of from 10 to 80% can be found in ranges of recrystallization heat treatment temperature (material temperature) : 900 to 1,000° C., and heat treatment time ("soaking time" at which the central portion of a material is maintained for given heat treatment time): 0 to 3 minutes.

Figure 5:
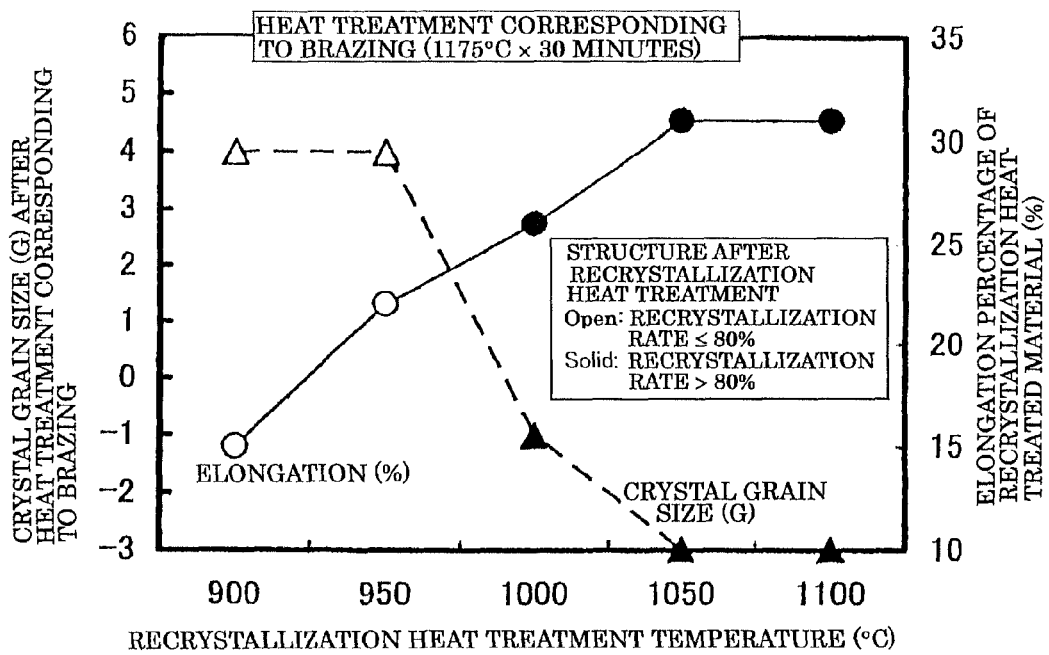
FIG. 5 is a graph exemplifying the relationship between recrystallization heat treatment temperature of ferritic stainless steel and elongation percentage of the treated steel, and crystal grain size G after subjecting the steel to a heat treatment corresponding to brazing.

FIG. 5 exemplifies data (solid line) examining elongation percentage obtained by conducting a tensile test of steel samples having been subjected to recrystallization heat treatment of 1 minute soaking at various temperatures using 18Cr-1Mn-2Mo-0.65Nb-0.1Cu steel which had been cold rolled at rolling reduction of 75%, and data (broken line) of crystal grain size G (JIS G0552: 2005) after heat treatment corresponding to brazing i. e. after heating at 1,175° C. for 30 minutes the steel to which about 2% working strain has been imparted after recrystallization heat treatment. Outline (open) plot is the material of the present invention corresponding to the recrystallization rate of from 10 to 80%, and black (solid) plot is a material having the recrystallization rate exceeding 80%. The recrystallization rate is decreased with lowering the temperature of the recrystallization heat treatment, so that elongation percentage of the material is decreased. In order to conduct a shape forming into a heat exchanger member, it is desired to select a material having elongation percentage of at least about 10%, but the elongation percentage of 10% can sufficiently be secured in a range of the recrystallization rate of 80% or less. In the case of using a steel having the recrystallization rate in percentage of from 10 to 80%, grain coarsening after high temperature brazing can be prevented. On the other hand, when the temperature of the recrystallization heat treatment is increased, the recrystallization rate exceeds 80%, and the elongation percentage (processability) is good similar to an annealed material of general ferritic stainless steel, but the crystal grain size G after high temperature brazing becomes −3, and remarkable grain coarsening occurs. In the steel having the component composition defined in the present invention, the same tendency is recognized in any steel.

Component elements are described below. Unless otherwise indicated, "%" in the component composition means "% by mass".

C and N are elements forming Nb carbide and nitride when Nb is added with. In case Nb is consumed by those precipitates and solid solution Nb is decreased, improvement effect due to the solid solution Nb upon high temperature strength and its inhibition effect of crystal grain coarsening are impaired. Therefore, it is necessary in the present invention to restrict C content to 0.03% or less, and the C content of 0.025% or less is preferred. Furthermore, N content is necessary to be restricted to 0.03% or less, and the N content is preferably 0.025% or less.

However, regarding inhibition of crystal grain coarsening at high temperature brazing, pinning effect by Nb carbide and nitride can contribute to the inhibition. Therefore, it is advantageous to secure a certain extent of C and N contents. As a result of various investigations, it is desired that the total content of C and N is 0.01% by mass or more. Regarding the individual elements, it is preferred to secure C: 0.005% by mass or more and N: 0.005% by mass or more.

Si is an element of improving high temperature oxidation properties. However, excess Si content makes a ferrite phase hard, and becomes a factor of workability deterioration. Furthermore, the excess Si content deteriorates nickel grazing ability (wettability with nickel brazing filler). As a result of various investigations, the Si content is restricted to a range of more than 0.1 to 3%, and more preferably a range of from 0.3 to 2.5%. The upper limit can be restricted to 1.5%.

Mn is an element improving high temperature oxidation properties, particularly scale releasability resistance. However, excessive addition of Mn encourages formation of austenite phase at high temperature. It is desired in the present invention to prepare a ferrite single-phase type component composition that does not form austenite phase at a brazing temperature of 1,100° C. or higher. As a result of various investigations, the Mn content is restricted to a range of from 0.1 to 2%.

Cr acts on stabilizing high temperature oxidation resistance properties of steel. Therefore, it is necessary to secure 10% or more of the Cr content. However, excess Cr content inhibits manufacturability and workability of steel. For this reason, the Cr content is restricted to a range of 35% or less, and the Cr content of 25% or less is more preferred.

Nb is an important element in the present invention, and effectively acts on the increase of high temperature strength and the suppression of crystal grain coarsening at high temperature brazing. Mainly solid solution strengthening of Nb greatly contributes to the improvement of high temperature strength, but it is considered that pinning effect by precipitates such as $Fe_2Nb$ (Laves) and $Fe_3NbC$ (M6X), finely dispersed in ferrite matrix effectively acts on the suppression of crystal grain coarsening. In order to sufficiently exhibit those actions, it is important to secure 0.2% or more of Nb content, in addition to that C and N contents are restricted to the above ranges. In particular, in order to suppress crystal grain coarsening at high temperature brazing, it is effective to increase the Nb content, and it is preferred that the Nb content is 0.3% or more, and furthermore 0.4% or more. However, where the Nb content is increased, the Nb content adversely affects hot workability and surface quality characteristics of steel. Therefore, the Nb content is restricted to a range of 0.8% or less.

Mo, Cu, V and W mainly contribute to the improvement of high temperature strength by mainly solid solution strengthening. Therefore, as necessary, at least one of those elements can be contained. In particular, it is more effective to secure 0.05% or more of the total content of those elements. However, excessive addition of those elements adversely affects hot workability. Furthermore, the excessive addition becomes a factor of inhibiting low temperature toughness. As a result of various investigations, in the case of adding at least one of Mo, Cu, V and W, the total content thereof should be suppressed to 4% or less.

Ti and Zr acts on forming fine precipitates bonded with C and N and improving high temperature strength by dispersing the fine precipitates in steel. Therefore, as necessary, at least one of those elements can be contained. However, where those elements each are contained in a large amount, it becomes a factor to induce the decrease in hot workability and surface quality characteristics. Furthermore, because those are elements to form a strong oxide film on the steel surface, flow of a molted brazing filler may become poor by the oxide film. As a result of investigations, where at least one of Ti and Zr is added, the total content should be suppressed to 0.5% or less. In particular, the total content in a range of from 0.03 to 0.3% is effective, and the total content of from 0.03 to 0.25% is more preferred.

Ni and Co are remarkably effective to suppress decrease of toughness in the case that crystal grains are lightly coarsened by high temperature brazing. Furthermore, those elements are advantageous to improve high temperature strength. Therefore, as necessary, at least one of those elements can be contained. In particular, it is effective to secure 0.5% or more of the total content of Ni and Co. However, excessive addition of Ni and Co causes the formation of austenite phase at high temperature region, which is not preferred. In the case of adding at least one of Ni and Co, the total content of Ni and Co should be suppressed to a range of 5% or less.

Al, REM (rare earth metal) and Ca are elements to improve high temperature oxidation characteristics, and in the present invention, at least one of those can be added as necessary. In particular, it is more effective to secure 0.01% or more of the total content of Al, REM and Ca. However, addition in large amount decreases manufacturability by the decrease of toughness and the like. As a result of various investigations, Al should be suppressed to a range of 6% or less, REM should be suppressed to a range of 0.2% or less, and Ca should be suppressed to a range of 0.1% or less.

It has been confirmed that the ferritic stainless steel having the above composition has problem-free level in corrosion resistance to snow melting salt, corrosion resistance to LLC and corrosion resistance to condensed water, as compared with austenitic steel grade used in the conventional heat exchanger. High temperature strength (0.2% proof stress) in exhaust gas environment and scale release resistance, of the ferritic stainless steel were improved than those of austenitic steel grade.

The ferritic stainless steel having the above composition is subjected to the above-described recrystallization heat treatment, thereby forming partially recrystallized structure having recrystallization rate of from 10 to 80%. Thus, the steel of the present invention is obtained. The steel is formed into members such as an external cylinder, a partition plate, an air pipe and a fin provided in the air pipe, constituting a heat exchanger recovering heat of exhaust gas. Those members are joined by nickel brazing or the like, thereby a heat exchanger is built.

EXAMPLES

Steels having chemical compositions shown in Table 1 were melted, and each steel ingot obtained was formed into a round bar and a sheet by hot forging, thereby obtaining a round bar having a diameter of 15 mm and a sheet having a thickness of 30 mm. The round bar was subjected to a solution treatment by setting a holding temperature in a range of from 1,000 to 1,100° C. The sheet was hot rolled into a hot rolled sheet having a thickness of 4 mm. The sheet was subjected to annealing, and then cold rolled into a cold rolled sheet having a thickness of 1 mm. The sheet was subjected to recrystallization heat treatment as final annealing by setting a holding temperature in a range of from 850 to 1,100° C. Thus, materials having various recrystallization rates were obtained. Thereafter, the materials excluding some materials were subjected to cold rolling in a light reduction ratio (shown in Table 2) in which crystal grain coarsening is easy to occur at high temperature brazing. Thus, sample steels were prepared. Steel No. N means austenitic stainless steel.

TABLE 1

| Classification | Steel No. | Chemical Composition (% by mass) | | | | | | | | | | | | | | | |
|---|---|---|---|---|---|---|---|---|---|---|---|---|---|---|---|---|---|
| | | C | Si | Mn | Ni | Cr | Nb | Ti | Al | N | Mo | Cu | W | V | Co | Zr | REM | Ca |
| Invention steel | A | 0.009 | 0.92 | 1.09 | — | 13.93 | 0.39 | — | — | 0.008 | — | — | — | — | — | — | — | — |
| | B | 0.012 | 0.54 | 0.24 | — | 18.53 | 0.43 | — | — | 0.012 | — | 0.46 | — | — | — | — | — | — |
| | C | 0.008 | 0.28 | 1.02 | — | 18.37 | 0.42 | — | — | 0.013 | 1.93 | — | — | — | — | — | — | — |
| | D | 0.008 | 0.33 | 1.01 | — | 18.33 | 0.63 | — | — | 0.011 | 2.01 | — | — | — | — | — | — | — |
| | E | 0.009 | 0.69 | 1.33 | 0.72 | 19.01 | 0.31 | 0.06 | 0.07 | 0.009 | — | 0.45 | 0.09 | 0.04 | — | — | — | — |
| | F | 0.007 | 2.30 | 0.24 | 0.26 | 16.49 | 0.55 | 0.13 | — | 0.008 | 0.34 | 1.30 | 0.10 | — | 0.03 | — | — | — |
| | G | 0.013 | 0.58 | 0.64 | 0.37 | 17.34 | 0.75 | — | 0.25 | 0.009 | — | — | 0.18 | 0.06 | — | — | 0.05 | 0.03 |
| | H | 0.025 | 0.50 | 0.87 | 0.93 | 16.44 | 0.60 | 0.07 | 0.06 | 0.014 | — | 0.22 | — | 0.05 | 3.21 | — | — | — |
| | I | 0.006 | 0.95 | 0.88 | — | 10.50 | 0.51 | — | 0.08 | 0.009 | 0.10 | 0.30 | — | 0.09 | — | — | — | — |
| | J | 0.009 | 0.26 | 0.47 | 0.25 | 17.28 | 0.49 | — | 0.09 | 0.012 | 0.16 | 0.43 | — | — | — | 0.15 | — | — |
| | K | 0.008 | 0.30 | 0.28 | — | 18.38 | 0.39 | — | 0.09 | 0.016 | — | 0.57 | 3.15 | 0.04 | — | — | — | — |

TABLE 1-continued

| Steel Classification | Steel No. | Chemical Composition (% by mass) | | | | | | | | | | | | | | | |
|---|---|---|---|---|---|---|---|---|---|---|---|---|---|---|---|---|---|
| | | C | Si | Mn | Ni | Cr | Nb | Ti | Al | N | Mo | Cu | W | V | Co | Zr | REM | Ca |
| Comparison steel | L | <u>0.035</u> | 0.30 | <u>2.80</u> | — | <u>22.30</u> | <u>0.10</u> | 0.07 | 0.07 | 0.022 | 0.11 | 0.50 | 0.08 | — | — | — | — | — |
| | M | 0.016 | 0.50 | 0.44 | 0.26 | 18.46 | 0.22 | <u>0.35</u> | — | 0.009 | <u>3.41</u> | <u>1.60</u> | — | 0.04 | 0.03 | — | — | — |
| | N | 0.013 | 0.46 | 0.34 | 8.50 | 15.97 | 0.29 | <u>0.23</u> | <u>0.25</u> | 0.009 | 0.12 | 0.55 | — | 0.04 | <u>0.53</u> | — | — | — |

Underline: Outside the range defined in the present invention

The following characteristics were examined using the sample steels obtained.

0.2% Proof Stress at 700° C.

High temperature tensile test piece having a diameter at a parallel body of 10 mm was prepared from the round bar after solution heat treatment. About 2% of tensile strain was imparted to the test piece at room temperature, a high temperature tensile test at 700° C. was performed according to JIS G0567, and 0.2% proof stress was measured. From the fact that the steel having 0.2% proof stress at 700° C. of 100 N/mm$^2$ or more has the characteristics exceeding those of the conventional austenitic steel grade as a heat exchanger, the test piece having such characteristics was judged as "Acceptable".

High Temperature Oxidation Properties in Repetitive Cycle

Sample piece of 25 mm×35 mm was cut out of the sheet sample having a thickness of 1 mm, and then subjected to a heat treatment corresponding to the brazing at 1,175° C. for 30 minutes. Thereafter, the entire surface of the sample piece was subjected to #400 wet polishing finish, thereby preparing a high temperature oxidation test piece. Simulating the repeated use as a heat exchanger member, the cycle of "900° C.×25 minutes heating→natural cooling at room temperature for 10 minutes" was conducted 1,000 cycles in atmosphere and 60° C. saturated water vapor. Change in mass ("plus" means increase, and "minus" means decrease) of the test piece before the test and after the test was divided by the surface area of the test piece before the test, thereby obtaining the change in mass per unit area. When the absolute value of the change in mass is 10 mg/cm$^2$ or less, it is evaluated as having excellent high temperature oxidation properties as a heat exchanger member, and the test piece having 5 mg/cm$^2$ or less is particularly excellent.

Brazability (Wettability)

Two brazing test pieces each having 10 mm×20 mm were cut out of the sheet sample having a thickness of 1 mm in each steel grade. Entire surface of one of the two test pieces was coated with a pasty brazing filler metal in 0.5 mm thickness in a state that the test piece was horizontally placed. Other one test piece was placed on the coated test piece, thereby constituting a laminate including three layers of test piece/brazing filler metal/test piece. The laminate was placed in a vacuum furnace while horizontally maintaining the laminate, and after vacuum drawing, the laminate was heated at 1,175° C. for 30 minutes. After cooling, the laminate was taken out of the furnace, and the surface of the upper test piece (test piece to which Ni brazing filler was not applied) was observed. The area wetted by the brazing filler metal on the surface was divided by the entire area of the surface of the test piece. Thus, coverage of the brazing filler metal was obtained. The test piece having the coverage of brazing filler metal of 50% or more was evaluated as "A", the test piece having the coverage of brazing filler metal of from 20% to less than 50% was evaluated as "B", and the test piece having the coverage of brazing filler metal of less than 20% was evaluated as "C". Test pieces having the evaluation of "A" or "B" were considered "Acceptable". The brazing filler metal used had the composition of 19% by mass Cr-10% by mass Si-71% by mass Ni (corresponding to BNi-5 of JIS Z3265).

Resistance to Grain Coarsening

Regarding the test piece to which the Ni brazability was evaluated, metal structure of its cross-section (Cross-section parallel to rolling direction and thickness direction: L cross-section) was observed with an optical microscope. Etching was conducted using a mixed acid of hydrofluoric acid and nitric acid. The test piece having an average crystal grain size of 200 μm or less was evaluated as "A", the test piece having an average crystal grain size of from more than 200 μm to 500 μm was evaluated as "B", and the test piece having an average crystal grain size of more than 500 μm was evaluated as "C". The test piece having evaluation "A" or "B" was considered "Acceptable". The average crystal grain size used was an average value by an equivalent circle diameter described before.

Those results are shown in Table 2

TABLE 2

| Classification | No. | Steel No. | Recrystallization heat treatment temperature (° C.) | Recrystallization rate (%) | Reduction ratio before heat treatment corresponding to brazing (%) | 0.2% proof stress (N/mm$^2$) at 700° C. | Mass change by 900° C. repetitive oxidation test (mg/cm$^2$) | Brazability (Wettability) | Resistance to coarsening |
|---|---|---|---|---|---|---|---|---|---|
| Invention Example | 1 | A | 850 | 23 | 2.03 | 148 | 2.1 | A | A |
| | 2 | B | 850 | 35 | 5.04 | 148 | 2.6 | A | A |
| | 3 | C | 950 | 55 | 2.02 | 170 | 1.6 | A | A |
| | 4 | D | 950 | 57 | 2.07 | 173 | 1.2 | A | A |
| | 5 | E | 950 | 45 | 4.99 | 121 | 2.2 | A | A |
| | 6 | F | 950 | 68 | 5.06 | 151 | 1.1 | B | A |
| | 7 | G | 950 | 45 | 5.02 | 138 | 2.4 | B | A |
| | 8 | H | 950 | 48 | 4.98 | 159 | 3.1 | A | A |
| | 9 | I | 950 | 51 | 2.04 | 148 | 4.1 | A | A |
| | 10 | J | 950 | 49 | 1.97 | 138 | 3.6 | A | A |
| | 11 | K | 950 | 55 | 2.00 | 145 | 2.9 | A | A |

TABLE 2-continued

| Classification | No. | Steel No. | Recrystallization heat treatment temperature (° C.) | Recrystallization rate (%) | Reduction ratio before heat treatment corresponding to brazing (%) | 0.2% proof stress (N/mm²) at 700° C. | Mass change by 900° C. repetitive oxidation test (mg/cm²) | Brazability (Wettability) | Resistance to coarsening |
|---|---|---|---|---|---|---|---|---|---|
| Comparative Example | 21 | A | 1000 | 85 | 1.98 | 145 | 2.2 | A | C |
| | 22 | A | 1050 | 92 | 2.03 | 145 | 2.2 | A | C |
| | 23 | B | 1050 | 87 | 5.01 | 142 | 2.7 | A | C |
| | 24 | C | 1100 | 97 | 5.00 | 161 | 1.8 | A | C |
| | 25 | E | 1100 | 91 | 2.01 | 105 | 2.5 | A | C |
| | 26 | L | 1050 | 93 | 0 | 95 | 5.3 | A | C |
| | 27 | M | 1050 | 93 | 0 | 178 | 1.9 | C | B |
| | 28 | N | 1075 | 95 | 0 | 90 | −50.5 | C | A |

As is seen from Table 2, the ferritic stainless steel of the Invention Examples were excellent in 0.2% proof stress at 700° C. and high temperature oxidation properties in repetitive cycle, as compared with the austenitic stainless steel of Comparative Example No. 28. Brazability (wettability) and resistance to grain coarsening are good, and it was confirmed to have sufficiently satisfactory characteristics as a heat exchanger member.

Contrary to this, although Comparative Example Nos. 21 to 25 are satisfied with the chemical composition defined in the present invention, the recrystallization heat treatment temperature was inappropriate. As a result, the recrystallization rate exceeded 80%, and grain coarsening could not be prevented. No. 26 has high C content and low Nb content. Therefore, solid solution Nb amount is deficient, and high temperature strength (0.2% proof stress at 700° C.) and resistance performance to grain coarsening were poor. No. 27 was that because Ti content is excessive, an oxide film is easy to be formed on the surface at grazing, and brazability is poor. No.28 is austenitic stainless steel, and high temperature strength (0.2% proof stress at 700° C.) was lower level than other ferritic steel grade. Furthermore, due to influence that a coefficient of thermal expansion is large, scale is easy to separate in the repetitive cycle, and change in mass showed large minus value.

The invention claimed is:

1. A ferritic stainless steel material for brazing, having partially recrystallized structure and a chemical composition consisting of, in % by mass, C: 0.03% or less, Si: more than 0.1 to 3%, Mn: 0.1 to 2%, Cr: 10 to 35%, Nb: 0.2 to 0.8%, N: 0.03% or less, and the remainder being Fe and unavoidable impurities, wherein area ratio in percent of recrystallized grains formed by heating after cold working is from 10 to 80%.

2. A ferritic stainless steel material for brazing, having partially recrystallized structure and a chemical composition consisting of, in % by mass, C: 0.03% or less, Si: more than 0.1 to 3%, Mn: 0.1 to 2%, Cr: 10 to 35%, Nb: 0.2 to 0.8%, N: 0.03% or less, at least one of Mo, Cu, V and W in the total amount of 4% or less, and the remainder being Fe and unavoidable impurities, wherein area ratio in percent of recrystallized grains formed by heating after cold working is from 10 to 80%.

3. A ferritic stainless steel material for brazing, having partially recrystallized structure and a chemical composition consisting of, in % by mass, C: 0.03% or less, Si: more than 0.1 to 3%, Mn: 0.1 to 2%, Cr: 10 to 35%, Nb: 0.2 to 0.8%, N: 0.03% or less, at least one of Mo. Cu, V and W in the total amount of 4% or less, at least one of Ti and Zr in the total amount of 0.5% or less, and the remainder being Fe and unavoidable impurities, wherein area ratio in percent of recrystallized grains formed by heating after cold working is from 10 to 80%.

4. A ferritic stainless steel material for brazing, having partially recrystallized structure and a chemical composition consisting of, in % by mass, C: 0.03% or less, Si: more than 01 to 3%, Mn: 0.1 to 2%. Cr: 10 to 35%, Nb: 0.2 to 0.8%, N: 0.03% or less, at least one of Mo, Cu, V and W in the total amount of 4% or less, at least one of Ti and Zr in the total amount of 0.5% or less, at least one of Ni and Co in the total amount of 5% or less, and the remainder being Fe and unavoidable impurities, wherein area ratio in percent of recrystallized grains formed by heating after cold working is from 10 to 80%.

5. A ferritic stainless steel material for brazing, having partially recrystallized structure and a chemical composition consisting of, in % by mass, C: 0.03% or less, Si: more than 0.1 to 3%, Mn: 0.1 to 2%, Cr: 10 to 35%, Nb: 0.2 to 0.8% N: 0.03% or less, at least one of Mo, Cu, V and W in the total amount of 4% or less, at least one of Ti and Zr in the total amount of 0.5% or less, at least one of Ni and Co in the total amount of 5% or less, Al: 0.06to 6%, and the remainder being Fe and unavoidable impurities, wherein area ratio in percent of recrystallized grains formed by beating after cold working is from 10 to 80%.

6. A ferritic stainless steel material for brazing, having partially recrystallized structure and a chemical composition consisting of, in % by mass, C: 0.03% or less, Si: more than 0.1 to 3%, Mn: 0.1 to 2%, Cr: 10 to 35%, Nb: 0.2 to 0.8%, N: 0.03% or less, at least one of Mo, Cu V and W in the total amount of 4% or less, Al: 0.06 to 6%, and the remainder being Fe and unavoidable impurities, wherein area ratio in percent of recrystallized grains formed by heating after cold working is from 10 to 80%.

7. The ferritic stainless steel material according to any one of claims 1-5 and 6, wherein the total content of C and N is 0.01% or more.

8. A heat exchanger member comprising the ferritic stainless steel material according to any one of claims 1 to 5 and 6, brazed using any one of nickel brazing filler defined in Japanese Industrial Standards Z3265, nickel brazing filler containing Ni in an amount of 35% by mass or more, copper brazing filler or copper alloy brazing filler, defined in Japanese Industrial Standards Z3262, and iron brazing filler, wherein the steel has ferrite grains with a thickness less than a thickness of the steel and has an average crystal grain size of 500 μm or less.

9. The heat exchanger member according to claim 8, which is an exhaust gas recirculation cooler of automobiles, obtained by brazing the steel material using nickel brazing filler defined in Japanese Industrial Standards Z3265 or nickel brazing filler containing Ni in an amount of 35% by mass or more.

* * * * *